United States Patent Office 3,159,688
Patented Dec. 1, 1964

3,159,688
CATALYTIC OXIDATIVE DEHYDROGENATION
OF MONOOLEFINS
Thomas J. Jennings, Lafayette, and Hervey H. Voge, Berkeley, Calif., assignors to Shell Oil Company, New York, N.Y., a corporation of Delaware
No Drawing. Filed Mar. 22, 1961, Ser. No. 97,467
7 Claims. (Cl. 260—680)

This invention relates to a novel catalytic process for the oxidative dehydrogenation of monoolefins to more unsaturated compounds. In particular, it relates to a catalytic process for the production of dienes, specifically butadiene-1,3 from n-butenes.

Various means for dehydrogenating hydrocarbon compounds have been suggested in the art and such means comprise straight dehydrogenation techniques, including catalytic reactions as well as those involving mainly thermal decomposition and rearrangement.

Prior to the aforesaid oxidative dehydrogenation processes, the most used commercial process for the production of dienes, and in particular butadiene-1-3, was the straight dehydrogenation of corresponding monoolefins in the presence of an iron oxide catalyst promoted with sizeable amounts of potassium carbonate and generally a small amount of chromium oxide. This process is carried out in the presence of large excesses of steam such as, for example, mole ratios of at least 8 to 1 and generally about 12 to 1. Reaction temperatures generally are in the range of between 550 and 650° C.

An important factor in the production of dienes, and in particular butadiene-1,3, by dehydrogenation of the corresponding monoolefins is the selectivity of the dehydrogenation process. The percent selectivity is defined as 100 times the moles of desired product product divided by the moles of feed stock destroyed or otherwise converted. In order to obtain reasonable selectivity, the prior commercial process requires the use of low pressures, for example, between about 5 and 25 p.s.i.a. This requirement necessitates the use of extensive added equipment and complicates the recovery of the product. At near optimum conditions, a selectivity of around 80% may be obtained at a total conversion of around 20% in the dehydrogenation of butylenes to butadiene. The operations are sometimes conducted under conditions of temperature and space velocity to obtain conversions as high as about 40%, but generally somewhat lower conversions are preferred because the selectivity drops sharply as the conversion is increased. At 40% conversion the selectivity may be only 50-60%. Thus a major shortcoming of the stragiht dehydrogenation process is that the conversion must be limited to quite low values, say, about 25%, thus requiring the working up of large amounts of material to recover the product as well as a sizeable recycle, thereby increasing the size of the processing equipment.

It is a primary object of the present invention to provide a novel catalytic process for the dehydrogenation of monoolefins to corresponding dienes. It is a particular object of the invention to provide a thermally self-sufficient catalytic oxidative dehydrogenation process for the conversion of butylenes to butadiene-1,3.

In general outline, the process of the invention is a catalytic oxidative dehydrogenation which comprises passing a vaporized feed stream containing reactant olefin to be dehydrogenated together with suitable amounts of oxygen in an oxygen-containing gas, for example, air, and, if desired, minor amounts of steam at temperatures of from about 250° C. to about 600° C. over a promoted molybdate or tungstate catalyst, to be described in greater detail hereinafter, and treating the vaporous effluent therefrom in appropriate manner to recover conjugated diolefin as the major reaction product.

By oxidative dehydrogenation is meant a process wherein molecular oxygen from a convenient oxygen-containing gas, generally air, is introduced into the reaction zone in the presence of a catalytically active material which promotes the removal of hydrogen from the hydrocarbon feed with the formation of water. In this reaction, the equilibrium in the direction of the desired dehydrogenation product is very favorable, in contrast to normal dehydrogenation processes.

Certain of the major advantages and features of importance of the process are enumerated, as follows:

(1) The process may be operated with no added steam while still retaining the activity of the catalyst at a high level.

(2) The process may be operated at relatively low temperatures (250 to 550° C.). Whereas it is important to quickly quench the reaction product from the rather high reaction temperature of a safe temperature in the commercial straight dehydrogenation process, this is not essential in the process of the present invention wherein lower temperatures can be used to advantage.

(3) Potassium carbonate is not an essential ingredient in the catalyst and, in fact, its presence is not recommended. Accordingly, difficulties occasioned by the hydroscopic nature of this material are eliminated.

(4) The process may be conducted at relatively high pressures, if desired, e.g., from 5 to 150 p.s.i.a., thereby allowing the use of small equipment and facilitating the recovery of the product.

(5) The process may be operated at high conversions without sacrifice of the selectivity. This particular advantage is of major and paramount importance when processing commercial volumes of valuable olefinic materials.

While the process of the present invention may be adapated to the dehydrogenation of various substances, such as, for example, the oxidative dehydrogenation of isoamylenes to isoprene, n-amylenes to piperylene, and higher olefins such as hexenes and heptenes to corresponding products of greater unsaturation, it is of particular value at present for the dehydrogenation of n-butylenes to butadiene. The n-butylene may be butene-1 or butene-2, either cis or trans, or a mixture of normal butylenes, for example, such as can be separated from the products obtained in the cracking of petroleum oils or by the catalytic dehydrogenation of n-butane. The feed stock may contain inert diluents such as paraffinic or naphthenic hydrocarbons up to about 10 carbon atoms.

The feed stock may be catalytically dehydrogenated in the presence of added steam, but it is to be emphasized that the presence thereof is at most of only a small benefit and is by no means essential. Recommended proportions of steam are from about 0.1 to 2 moles per mole of reactant but, as indicated, larger amounts may be used if found of some particular advantage. On the other hand, steam can be omitted altogether.

In the process of the present invention, a certain amount of oxygen is passed with the feed stock into the reaction zone. Recommended amounts are between about 0.3 and 2.0 moles per mole of olefin reactant. The stoichiometric quantity is around 0.5 mole per mole of olefin to be converted. It is preferred to use a stoichiometric excess, e.g., around 0.5 to 1 mole per mole of olefin. The oxygen may be supplied as pure or substantially pure oxygen, or it may be in diluted form as in the case of air.

It is generally preferred to maintain the concentration of oxygen in the reactant mixture below about 12% v. although somewhat higher concentrations may be used if the concentration of the olefin reactant is at least about 10% v. when operating at 30 p.s.i.g., at least 15% v. when operating at 100 p.s.i.g. and at least 20% v. when operating at 300 p.s.i.g. Thus, when using pure oxygen it is frequently desirable to dilute the mixture with an inert or substantially inert diluent which may be steam, nitrogen, vapors of paraffin hydrocarbons, carbon dioxide, or the like. On the other hand, if the amount of oxygen is such that it would constitute more than about 12% v. of the reaction mixture, the oxygen may be introduced in increments, e.g., by injecting part of the oxygen separately at one or more points into the reaction zone.

The catalyst used in the process is essentially a promoted oxide of molybdenum or tungsten with or without the elements iron, cobalt or nickel, and may be regarded either as a mixture of oxides or as a compound of the above elements. In accordance with an important embodiment of the invention, elements from the groups V$a$ and VI$a$ of the Periodic Chart of the Elements as published by the Fisher Scientific Company (1957) having atomic numbers from 33 through 52, inclusive (As, Se, Sb, Te) are incorporated into the above oxide catalytic mass as promoters, either individually or in combination with each other as will be described in further detail hereinafter.

The amount of promoter, calculated as the oxide of the particular element, may vary over fairly wide ranges and can be expressed in general terms as from an amount having a desirable effect on the selectivity of the mixed oxide mass (e.g., $CoO \cdot MoO_3$) for the diene product to an amount no longer economically advantageous or of any real benefit. In this respect, the inclusion of the promoter material (e.g., Te as $TeO_2$) is not believed necessary or particularly advantageous in an amount as much as mole-to-mole proportions, although such has been used with desirable results, as will be evident from a consideration of the following examples. It has been found that the amount of promoter, calculated as the oxide of the element, can have a desirable effect when varied from 0.1% w., based on oxide catalyst mass, up to and even greater than a one-to-one mole ratio. However, a preferred amount of promoter on the oxide catalyst is from 0.1% w. to about 20% w.

While oxides of Mo or W with As, Se, Sb and/or Te as promoters give good results, further improvements are obtainable by incorporating Fe, Co, Ni, or Cu into the catalytic mass. These elements are preferably combined with the Mo or W oxide and they have the advantages of stabilizing the Mo or W oxide, of increasing strength, and of lowering the cost per pound of the catalytic mass without any decrease of activity. The amounts of these stabilizing elements may vary from, say, about 1 or 2% up to the stoichiometric amounts to form normal molybdates or tungstates, such as, for example, $CoMoO_4$.

The catalyst of the present invention may be prepared by any suitable method of bringing together an oxide or acid of molybdenum or tungsten with the promoter elements as salts or oxides. For example, any oxide, hydroxide, hydrated oxide or acid of molybdenum may be mixed with an oxide, decomposable salt, or compound, of As, Sb, Se, or Te, then dried and calcined. In this procedure it is advantageous to use freshly prepared, hydrated compounds such as hydroxides, hydrated oxides, or acids. However, many compounds of As, Se, or Te, being somewhat volatile, need not be freshly prepared since they rather readily interact chemically with Mo or W compounds to the proper extent for promotion when the mixture is calcined. Arsenic may be added as arsenic metal, $As_2O_3$, $As_2O_5$, arsenic acid, ammonium arsenate, or in other ways. Selenium may be added as the element, $SeO_2$, selenic acid, selenious acid, or ammonium selenide, for example. Antimony can be added as $Sb_2O_3$, $Sb_2O_5$, antimonyl nitrate, antimonic acid, and in various other ways. Because of the relatively low volatility of antimony and many of its compounds we prefer to use freshly precipitated antimony compounds or even to coprecipitate the antimony with Mo or W. In the case of tellurium the metal can be added, or $TeO_2$, telluric acid, ammonium tellurate, for example. It is also possible to add these promoters as volatile hydrides, e.g., $H_2Se$, $H_2Te$, $AsH_3$, $SbH_3$, by treating a preformed oxide mass with a gas stream containing hydride vapor.

The Mo or W oxide may be prepared by decomposition of ammonium molybdate or tungstate or by acidification of solutions of these salts. Another method is to decompose a molybdate or tungstate salt with hot nitric acid. Still other methods will suggest themselves to those skilled in the catalytic art. The Mo or W may also be coprecipitated with the As, Se, Sb, or Te by appropriate methods.

When Fe, Co, Ni, or Cu compounds of Mo or W are to be used it is best to precipitate these and then add the necessary amount of promoter. For example, an iron molybdate may be prepared by mixing ferric nitrate and ammonium molybdate solutions. To the precipitate $TeO_2$ can be added for formulation of the final catalyst. It is also possible to prepare the catalyst by heating together well mixed oxides, preferably freshly precipitated, for example, $Fe_2O_3 \cdot xH_2O$ and $MoO_3$. In this case a first calcination may precede addition of, e.g., $TeO_2$, and the latter is followed by a second calcination step.

The exact state of combination of the elements under operating conditions is not known. The catalyst may be a mixture of oxides moderated by one of the promoter elements mentioned, a solid solution, or some specific compound that is formed. In this connection, it will be appreciated that any convenient oxidation state of the elements described above can be used in catalyst preparation since in calcination and/or use the oxidation state of the catalyst adjusts itself to the desired state regardless of initial oxidation state.

The catalyst may be used in the form of granules or as pellets or powder. Moreover, it may be used with or without filler or carrier material. If a carrier is used, it is preferably one having a relatively large volume of pores of relatively large size, such, for instance, as pellets of Alundum (a bonded form of corundum), crushed fire brick, bonded diatomite, pumice, sintered or bonded silica sand aggregates, or the like. A relatively inert filler or binding agent in an amount up to about 50% by weight of the total may be included. Suitable materials are, for example, colloidal silica, ball clay, and the like. The carrier, if used, may be impregnated with the promoted catalytic mass by making use of solutions containing catalytically active material, or by using a freshly precipitated slurry thereof.

The dehydrogenation becomes substantial at a minimum temperature around 250° C. While temperatures of from about 300° C. to about 600° C. may be used to advantage, the preferred temperatures are between about 350° C. and 500° C. Higher temperatures up to about 650° C. can be used, but only if efficient means are provided to remove the exothermic heat of reaction. The temperatures mentioned are those near the reactor inlet. If a fixed bed of catalyst is used, the temperature down stream may be considerably higher, e.g., 75° C. higher.

The preferred pressure is near atmospheric, e.g., 5 to 75 p.s.i.a. On the other hand, higher pressures up to about 300 p.s.i.a. can be used and have the advantage of simplifying the product recovery.

In general, the process of the present invention allows a high space velocity to be used. Thus, comparatively small reactors and catalyst inventories may be employed to advantage. For example, gaseous hourly space velocities up to about 30,000 may be used while still obtaining reasonable conversions. Gaseous hourly space velocity, abbreviated GHSV, is defined as the volumes of total feed vapor calculated under standard condition (STP) passed per hour per unit volume of the catalyst bed. A wide range of space velocities may be used. Generally space velocities between about 500 and 5000 are very satisfactory. Temperature, pressure, and space velocity should be jointly adjusted to obtain a conversion in the most favorable range, normally 40–90%.

The contact of the feed vapors, oxygen, and steam, if any, is preferably effected by providing the catalyst in the form of a fixed foraminous bed of particles maintained at the reaction temperature and passing the feed vapors through the bed in a continuous or substantially continuous manner. In this method of operation, the partial pressure of oxygen is high (maximum) at the inlet of the catalyst bed and declines toward the outlet. The concentration of diolefin product, on the other hand, is substantially zero at the inlet of the bed and maximum at the outlet. Thus, the concentration of oxygen is highest where the concentration of the desired product is lowest, and the concentration of oxygen is lowest where the concentration of the desired product is highest. It is also possible to use the catalystic material in powder form. Thus the powdered catalyst (e.g., passing a 100-mesh U.S. standard sieve) can be dispersed in the reactant vapor mixture and the dispersion passed through the reaction zone. Alternatively, the reactant vapor mixture may be passed up through a fluidized bed of the catalyst. In this case the oxygen may be separately introduced into the catalyst bed.

The gaseous mixture issuing from the reaction zone may be quenched but this is normally not essential. Except in some cases when operating at the upper limit of the recommended temperatures, there is little tendency for side reactions to take place. The effluent is preferably cooled by indirect heat exchange with the feed and then washed with dilute caustic to neutralize any traces of organic acids present and condense and remove any steam, if air is used to supply the oxygen the remaining mixture is preferably compressed and scrubbed with oil to separate the hydrocarbons from the nitrogen, from carbon dioxide and carbon monoxide produced as minor by-products, and from any unreacted oxygen. The hydrocarbon may be stripped from the oil and subjected to an extractive distillation with a suitable selective solvent or to a copper ammonium acetate treatment in the known manner to separate and recover the diolefin product. Only traces of oxygenated products, such as furan, aldehydes, ketones, etc., are formed in this process.

The following examples are offered for purposes of illustration and further explanation of the invention, but it is not intended to limit the invention to the exact details as shown therein but only as to the spirit and scope of the appended claims. Moreover, the results shown in accompanying Table I illustrates the effect of the catalyst of the present invention with regard to the production of 1,3-butadiene from 1-butene. The 2-butenes can be used as feed materials with nearly the same results. 2-Methylbutenes can be converted to isoprene.

EXAMPLE I

Molybdic acid was calcined for two hours, and 27 grams of the resulting oxide was mixed thoroughly with 3 grams of tellurium dioxide. This mixture was compressed to a 1-inch disc or tablet and calcined at 420° C. for two hours, then broken up and sieved to 10–20 mesh granules. A portion of this catalyst was heated in a reactor to 440° C. and a mixture containing 1-butene (16.7% by volume), oxygen (16.7% by volume), and argon (66.6% by volume) was passed over the catalyst at atmospheric pressure and total GHSV of 3600. Of the 1-butene fed, 67% was converted with a 90% selectivity to butadiene.

EXAMPLE II

Cobalt molybdate was prepared by dissolving 117 grams $(NH_4)_6Mo_7O_{24} \cdot 4H_2O$ in 200 ml. water and 83 ml. concentrated ammonium hydroxide. To this, a solution of 291 grams $Co(NO_3)_2 \cdot 6H_2O$ in 300 ml. water was added with stirring at 60° C. The resulting precipitate was allowed to age in the solution overnight, then collected, washed and dried at 120° C.

(1) Part of this dried material was pressed to a thin disc or tablet and calcined at 400° C. for two hours. The tablet was then broken and sieved to 10–20 mesh to give a cobalt molybdate catalyst.

(2) 22 grams of the dried cobalt molybdate was thoroughly mixed with 16 grams tellurium dioxide, pressed, calcined at 420° C. for two hours, then broken and sieved to 10–20 mesh granules.

(3) 20 grams of the dried cobalt molybdate was mixed with 0.2 gram tellurium dioxide; 10 ml. of water was added, and the whole was mixed to a smooth paste, then dried and granulated.

(4) 22 grams of the dried cobalt molybdate was thoroughly mixed with 0.22 gram $As_2O_3$, then pressed and granulated as in (2) hereinbefore.

(5) 20 grams of the dried cobalt molybdate (dried at 120° C.) was thoroughly mixed with 0.1 gram $H_2SeO_3$ dissolved in 10 grams of water, then dried at 110° C. and granulated.

(6) 0.1 gram $Sb_2O_3$ was added to 20 grams of the dried cobalt molybdate as in (3) hereinbefore.

The following Table I shows representative results obtained on these catalysts at atmospheric pressure with a feed mixture containing 1-butene (16.7% by volume), oxygen (16.7% by volume), and argon (66.6% by volume). Temperatures in Table I, and in other examples, are maximum or "hot-spot" temperatures.

Table I

| Catalyst | Temp., °C. | Total GHSV | Conversion, Percent | | Selectivity to Butadiene, Percent |
|---|---|---|---|---|---|
| | | | $O_2$ | $C_4H_8$ | |
| (1) $CoO \cdot MoO_3$ | 320 | 1,800 | 100 | 49 | 55 |
| | 320 | 3,600 | 100 | 36 | 41 |
| (2) 58%$CoO \cdot MoO_3$, 42% $TeO_2$ | 350 | 1,800 | 20 | 33 | 84 |
| | 380 | 900 | 71 | 80 | 81 |
| (3) $CoO \cdot MoO_3$+1% w. $TeO_2$ | 380 | 3,600 | 23 | 20 | 77 |
| | 440 | 3,600 | 99 | 47 | 62 |
| (4) $CoO \cdot MoO_3$+1% w. $As_2O_3$ | 380 | 3,600 | 22 | 19 | 82 |
| | 395 | 3,600 | 99 | 40 | 66 |
| (5) $CoO \cdot MoO_3$+1% w. $SeO_2$ | 410 | 3,600 | 49 | 22 | 60 |
| | 500 | 3,600 | 99 | 43 | 58 |
| (6) $CoO \cdot MoO_3$+0.5% w. $SbO_3$ | 410 | 3,600 | 35 | 23 | 70 |
| | 450 | 3,000 | 99 | 46 | 63 |

EXAMPLE III (1) A nickel molybdate catalyst was prepared from 291 grams $Ni(NO_3)_2 \cdot 6H_2O$ with 177 grams $$(NH_4)_6Mo_7O_{24} \cdot 4H_2O$$

as described for cobalt molybdate in Example II, except that only 30% of the oxide slurry was dried at 120° C. This part was then calcined, etc., as in Example II(1) hereinbefore.

(2) To the remaining 70% of the nickel molybdate slurry obtained as above was added 17 grams tellurium dioxide with stirring and allowed to age overnight. The precipitate was then collected, dried, pressed and calcined at 420° C. for two hours to give a nickel molybdate catalyst containing approximately 10% w. tellurium dioxide.

(3) An iron molybdate was prepared from 271 grams $Fe(NO_3)_3 \cdot 9H_2O$ with 177 grams $(NH_4)_6Mo_7O_{24} \cdot 4H_2O$ as described for cobalt molybdate in Example II. 29 grams of this dried powder was thoroughly mixed with 2.5 grams tellurium dioxide, pressed, calcined at 420° C. for two hours, then crushed and sieved to 10/20 mesh to give an iron molybdate containing approximately 10% tellurium dioxide.

The following Table II shows the results obtained on these catalysts at atmospheric pressure with a feed mixture as for Table I. A copper molybdate with 10% $TeO_2$ gave similar results.

Table II

| Catalyst | Temp., °C. | Total GHSV | Conversion, Percent $O_2$ | Conversion, Percent $C_4H_8$ | Selectivity to Butadiene, Percent |
|---|---|---|---|---|---|
| (1) $NiO \cdot MoO_3$ | 345 | 3,600 | 100 | 39 | 51 |
| (2) $NiO \cdot MoO_3 + 10\%$ w. $TeO_2$ | 355 | 3,600 | 13 | 22 | 87 |
|  | 405 | 3,600 | 46 | 57 | 78 |
| (3) $Fe_2O_3 \cdot 3MoO_3 + 10\%$ w. $TeO_2$ | 372 | 3,600 | 19 | 34 | 92 |
|  | 445 | 3,600 | 52 | 67 | 82 |

EXAMPLE IV

Tungstic oxide was prepared by acidifying a solution containing 50 grams $WO_3 \cdot H_2O$ as the ammonium salt at 75° C. with nitric acid to pH 0.3. The precipitate was allowed to age overnight, then collected, washed and dried at 115° C. Part of this material was calcined at 500° C. for two hours then sieved to 10-20 mesh granules. When a mixture of 1-butene (16.7% by volume), oxygen (16.7% by volume), and argon (66.6% by volume) was passed over this catalyst at atmospheric pressure and a total GHSV of 3600, 26% of the butene fed was converted at 417° C. with a selectivity of 45% to butadiene, i.e., butadiene was separated from the effluent in a yield of about 12% based on the butene feed.

EXAMPLE V 15 grams of the tungstic oxide prepared in accordance with Example IV and dried at 115° C. was thoroughly mixed with 1.7 grams tellurium dioxide, pressed, calcined at 420° C. for two hours, then crushed and sieved to 10-20 mesh. When used as in Example IV, 47% of the 1-butene fed was converted at 417° C. with a selectivity to butadiene of 62% and a yield of 29% based on the butene feed.

EXAMPLE VI 25 grams of tungstic acid ($WO_3 \cdot H_2O$) was thoroughly mixed with 14.7 grams $Sb_2O_3$. The mixture was pressed, calcined at 500° C. for two hours, then broken and sieved to 10-20 mesh granules. The resulting ratio of Sb/W=1. When the catalyst was used as in Example IV, 30% of the 1-butene fed was converted at 462° C. with a selectivity to butadiene of 92%. At 505° C. and a total GHSV of 1800, 57% of the 1-butene was converted with a selectivity to butadiene of 88%.

In practicing the invention, it may be found advantageous to maintain at a given level the concentration of the promoting materials in the catalytic mass, to wit, arsenic, antimony, tellurium or selenium, as such materials may sometimes volatlize to some degree under certain operating conditions. In order to replenish and maintain the desired level of such promoters, various methods will suggest themselves to those skilled in the art. For example, small amounts of such promoters may be added continuously or intermittently as vapors or fluidized solids as the occasion requires. Alternatively, the catalyst may be removed occasionally for replenishment or reimpregnated in situ with such promoters to the desired concentration levels. Such operations have been found in no way to interfere with the normal dehydrogenation processing.

We claim as our invention:

1. Process for the oxidative dehydrogenation of a monoolefin to its corresponding diolefin which comprises passing a hydrocarbon feed containing a substantial amount of said monoolefin in the vapor phase together with from about 0.3 to about 2 moles of oxygen per mole of monoolefin reactant through a reaction zone in contact with a catalyst comprising an oxygen-containing compound of a Group VIb element of the Periodic Chart of the Elements having an atomic number of from 42 through 74 promoted with an element from Group Va of the Periodic Chart of the Elements having an atomic number from 33 through 51, the amount of promoter, calculated as the oxide, being from 0.1% to about 20% by weight based on oxide catalyst mass under conditions including a temperature of between about 300 and 600° C. to oxidatively dehydrogenate said monoolefin to its corresponding diolefin.

2. Process in accordance with claim 1 wherein the catalyst also contains as a further ingredient a stabilizing amount of a Group VIII element of the Periodic Chart of the Elements having an atomic number from 26 through 28.

3. Process in accordance with claim 1 wherein the monoolefin is n-butene and the corresponding diolefin is butadiene.

4. Process in accordance with claim 1 wherein the catalyst comprises a molybdenum oxide promoted with arsenic.

5. Process in accordance with claim 1 wherein the catalyst is disposed as a fixed foraminous bed.

6. Process according to claim 1 wherein the dehydrogenation is effected at substantially atmospheric pressure.

7. Process according to claim 1 wherein the catalyst comprises a tungsten oxide promoted with antimony.

References Cited by the Examiner
UNITED STATES PATENTS

| | | | |
|---|---|---|---|
| 2,754,325 | 7/56 | Smith | 252—467 |
| 2,870,171 | 1/59 | Gable | 252—467 |
| 2,991,320 | 7/61 | Hearne | 260—680 |
| 2,991,322 | 7/61 | Armstrong et al. | 260—680 |
| 3,102,147 | 8/63 | Johnson | 260—604 |

ALPHONSO D. SULLIVAN, *Primary Examiner.*

PAUL M. COUGHLAN, *Examiner.*